March 22, 1960    H. C. REYNOLDS ET AL    2,929,361
BUFFER
Filed Aug. 9, 1957

INVENTORS
HAROLD C. REYNOLDS
EARLE D. KENNELL
BY Carder
THEIR ATTORNEY

United States Patent Office 2,929,361
Patented Mar. 22, 1960

2,929,361

BUFFER

Harold C. Reynolds and Earle D. Kennell, Athens, Pa., assignors to Ingersoll-Rand Company, New York, N.Y., a corporation of New Jersey Application August 9, 1957, Serial No. 677,286

5 Claims. (Cl. 121—32)

This invention relates to a tool holder and more particularly to a holder of the type that acts as a buffer.

It is one object of the invention to provide such a holder in which a member secured to the holder will cushion the blow of a reciprocating member striking the holder.

Another object of this invention is to provide a tool holder which cushions the force of a tool releasably engaged by said holder when it rebounds from striking the work and strikes the holder.

A further object is to provide a holder of relatively simple and inexpensive construction.

Figure 1:
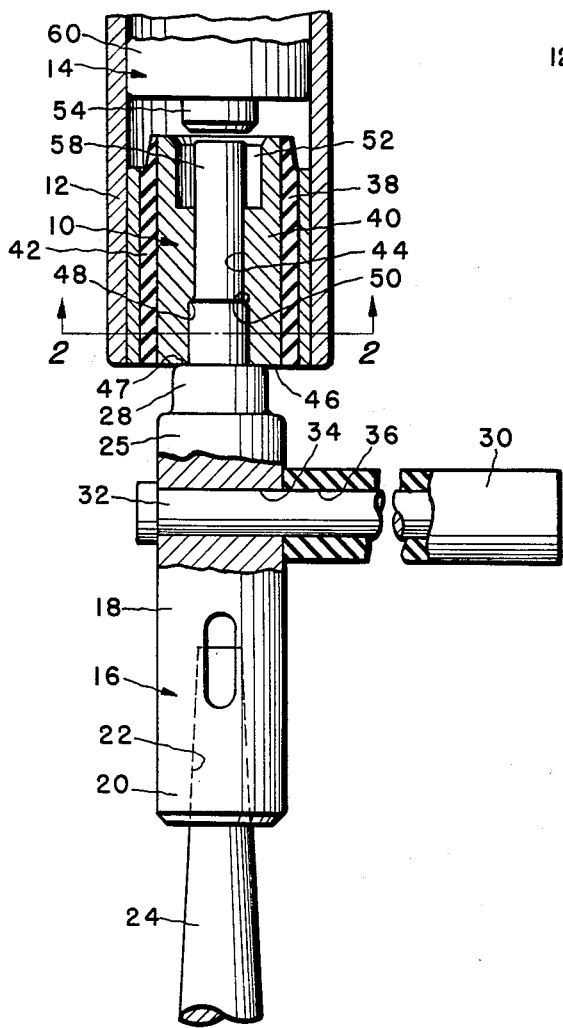
Figure 2:
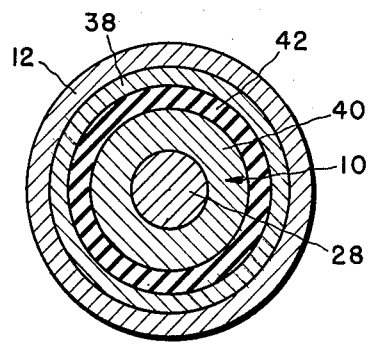
Figure 3:
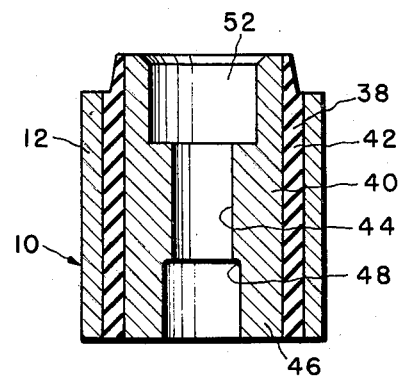

Further objects will become obvious from the following specification and drawings in which Figure 1 is a longitudinal elevation, partly in section, showing a preferred embodiment of the invention adapted to a tool and a casing, Fig. 2 is a cross sectional view of Figure 1 taken along the line 2—2 looking in the direction of the arrows, Fig. 3 is a longitudinal elevation, in cross section, of the holder shown in Fig. 1.

Referring to the drawings and first to Figure 1, the holder 10 is press fitted in the forward end of a casing 12 housing a piston 14 that is slidable fitted therein and in axial alignment with the tool holder 10. A tool 16 is releasably engaged by the holder 10 and is arranged therein so that the reciprocating piston 14 can strike the tool 16, thereby forcing said tool 16 into the work (not shown). The blow of the piston 14 on the tool 16 will force said tool 16 away from the holder 10, and the rebound of the tool 16 from the work (not shown) will cause the tool to move toward the holder 10. This process is repeated with each blow of the piston 14 on the tool 16.

The tool 16, in this instance, comprises a casing 18 with one end 20 having a tapered socket 22 for firmly engaging a similarly tapered drill bit 24. The other end 25 of said casing 18 has a shank 28 that extends into the tool holder 10. A rubber handle 30 is secured to the casing 18 and extends perpendicularly from the longitudinal axis of the casing 18. A pin 32 extends through a hole 34 in the casing and on into a passageway 36 in the handle 30, thereby giving the handle 30 greater rigidity. The purpose of the handle 30 is to give the operator control of the tool 16.

The tool holder 10 includes an outer hollow cylindrical member 38 and an inner cylindrical member 40 coextensive therein and extending beyond the outer cylinder 38 in the rearward direction. A cushioning element 42 is located between the cylinders 38 and 40 and is secured thereto. In this instance, the cushioning element 42 is a hollow cylindrical member made of rubber vulcanized along its entire length to the cylinders 38 and 40. A bore 44 extends through the inner cylinder 40 and releasably engages the shank 28. In furtherance to this end, the forward end 46 of the inner cylinder 40 acts as a shoulder for engaging a shoulder 47 of the shank 28, thereby limiting the longitudinal movement of the tool 16. An abutment 48 in the bore 44 also limits the longitudinal movement of the shank 28 by having the abutment 48 engage a second shoulder 50 on said shank 28.

A nose 54 of reduced diameter on the forward end of the piston 14 is positioned to freely enter the enlarged section 52 of the bore 44 to strike the rear end 58 of the shank 28 whenever located therein. Under normal conditions the body 60 of the piston 14 will not make contact with the rear end of the tool holder 10 because the piston's blow on the shank 28 will stop the forward motion of the piston 14 before making said contact. However, if the piston 14 is not stopped, its body 60 may strike the tool holder 10. This could occur if the piston 14 was moving in the forward direction and the tool 16 was partially or completely removed from the holder 10. To eliminate the shock of the blow if the piston 14 does strike the holder 10, the rear end portion of the inner cylinder 40 is made to extend beyond the rear end portion of the outer cylinder 38 and the elastic element 42 is placed between the cylinders 38 and 40. With this construction then, the piston 14 strikes the inner cylinder 40 only and the element 42 cushions the blow. If the tool holder 10 were a rigid body or if the inner cylinder 40 did not extend beyond the outer cylinder, the force of the piston 14 striking the holder 10 could crack the casing 12 because the full force of the blow would be directly transmitted to the casing 12. In addition, if the tool 16 strikes the forward end 46 of the inner cylinder 40 when it rebounds from the work, the element 42 will also cushion these blows.

Reviewing briefly the operational cycle of this machine. The tool holder 10 releasably engages the tool 16 and readies said tool 16 for repeated blows from the reciprocating piston 14, thereby driving the tool 16 into the work. Normally the piston 14 does not strike the tool holder 10, however, if it does the force of the blow will be cushioned by the element 42. In addition, when the tool 16 rebounds from striking the work, its longitudinal movement is limited by shoulder 50 and its striking force on the tool holder 10 is cushioned by the element 42.

While we have shown and described a specific form of our invention, it is to be understood that various changes and modifications may be made without departing from the spirit of the invention as set forth in the appended claims.

We claim:

1. A tool holder for positioning therein a tool to be struck on one end by a piston, including an outer hollow cylinder, an inner cylinder being of greater length than the outer cylinder extending therebeyond in the direction of the piston and providing a striking surface for the piston outwardly of the portion of such piston adapted to contact the tool, a bore through said inner cylinder adapted to releasably engage such a tool, and a cushioning element located between the inner and outer cylinders and secured to the cylinders along their entire coextensive lengths.

2. A tool holder adapted to be inserted in the casing of a motor provided with a reciprocating piston and for holding a tool to be struck by such piston, comprising an outer hollow cylinder held in the forward portion of said casing, an inner hollow cylinder having a bore therethrough and capable of movement relative to said casing, said inner hollow cylinder having a striking surface for the piston outwardly of the portion of such piston adapted to strike the tool, and a cushioning element interposed between the cylinders and fixed thereto, a tool adapted to be inserted in said bore for positioning said tool to be struck by said piston, and cooperating means on the tool and on the inner cylinder to limit longitudinal movement of said tool in the direction of the piston, said tool being capable of moving relative to both said casing and said inner cylinder.

3. The tool holder claimed in claim 2, in which the inner cylinder extends beyond the end of the outer cylinder in the direction of the piston to prevent said piston from striking said outer cylinder.

4. A tool holder adapted to be inserted in the casing of a percussive motor provided with a reciprocating piston and for receiving and holding a flanged tool to be struck by such piston, comprising an outer sleeve held immovable in the casing and larger than the flange of the tool, an inner sleeve longer than the outer sleeve providing a bearing for the tool flange and a striking surface for the piston outwardly of the portion of such piston adapted to contact the tool end and an elastic sleeve bonded to both the inner and outer sleeves.

5. The tool holder claimed in claim 4 in which said elastic sleeve is normally unflexed.

References Cited in the file of this patent

UNITED STATES PATENTS

| | | |
|---|---|---|
| 1,789,567 | Stevens | Jan. 20, 1931 |
| 2,472,352 | Van Sittert | June 7, 1949 |
| 2,685,274 | Liddicoat | Aug. 3, 1954 |

FOREIGN PATENTS

| | | |
|---|---|---|
| 253,772 | Switzerland | Dec. 1, 1948 |
| 835,584 | Germany | Apr. 3, 1952 |

OTHER REFERENCES

Vibration Control, Bulletin No. 104, pp. 12, 13 and 19, published October 1944, by Lord Manufacture Co.